United States Patent [19]
Labat et al.

[11] 3,980,164
[45] Sept. 14, 1976

[54] TRANSMISSION SYNCHRONIZER AND DOG-CLUTCH UNIT

[75] Inventors: Pierre Labat; Michel Oudard, both of Suresnes, France

[73] Assignee: Societe Anonyme de Vehicules Industriels et d'Equipments Mecaniques Saviem, Suresnes, France

[22] Filed: June 5, 1975

[21] Appl. No.: 584,063

[30] Foreign Application Priority Data
June 7, 1974  France .................. 74.19730

[52] U.S. Cl. .................. 192/53 E; 192/53 F
[51] Int. Cl.² .................. F16D 23/06
[58] Field of Search .................. 192/53 E, 53 F

[56] References Cited
UNITED STATES PATENTS

| | | | |
|---|---|---|---|
| 2,409,148 | 10/1946 | Peterson et al. | 192/53 E |
| 3,804,218 | 4/1974 | Krutashov | 192/53 E |

*Primary Examiner*—Allan D. Herrmann
*Attorney, Agent, or Firm*—Fleit & Jacobson

[57] ABSTRACT

The invention relates to a synchronizing unit wherein the resilient member interposed between the coupling ring and the synchromesh rings consists of a split cylindrical expansible sleeve fitted in a pre-stressed state in the central portion of the coupling ring, said sleeve having outflaring ends adjacent to each inner surface of the synchromesh rings, respectively, said synchromesh rings being in a manner known per se rigidly interconnected. The central portion of said sleeve comprises a groove having inclined marginal portions adapted to co-act with said coupling member, whereby in the neutral position of said coupling ring the friction cones of the synchronizer are not in mutual contact. This synchronizing unit is particularly suitable for change-speed mechanisms of motor vehicles.

2 Claims, 9 Drawing Figures

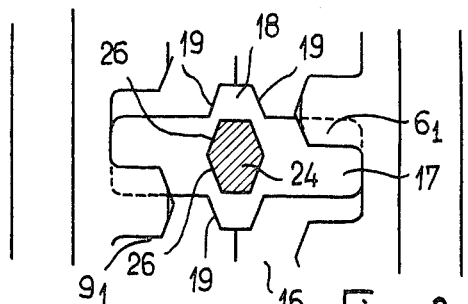
Fig-3
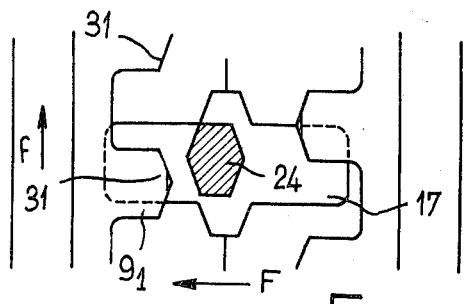
Fig-5
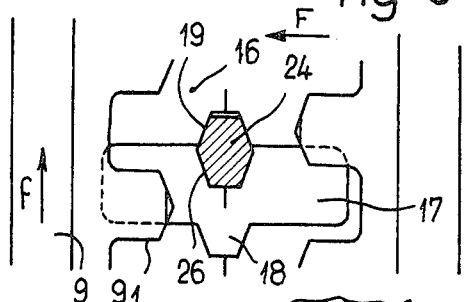
Fig-4
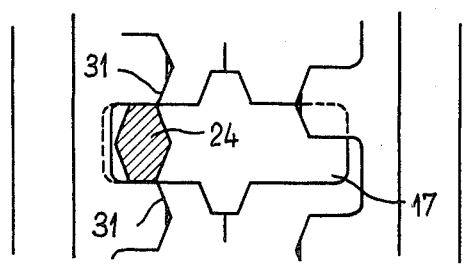
Fig-6
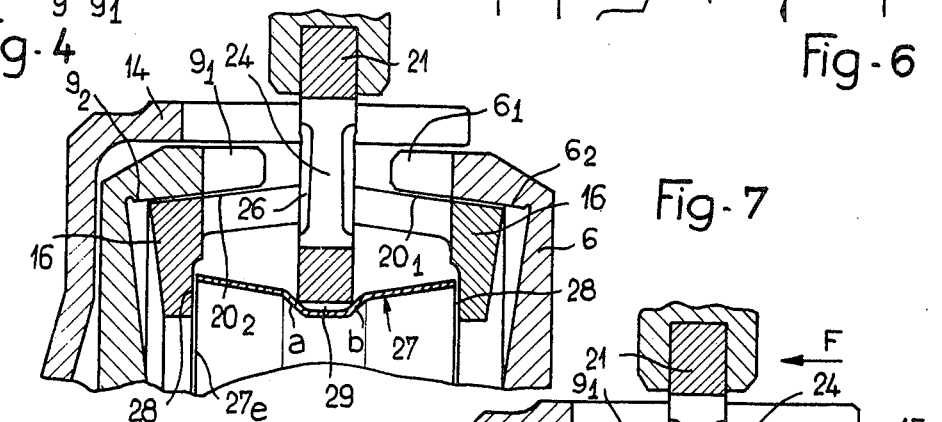
Fig-7
Fig-8
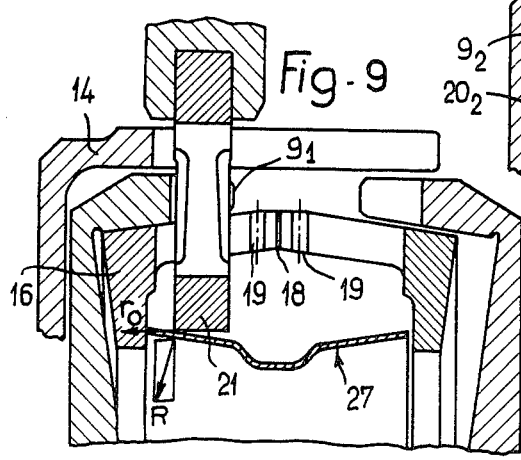
Fig-9
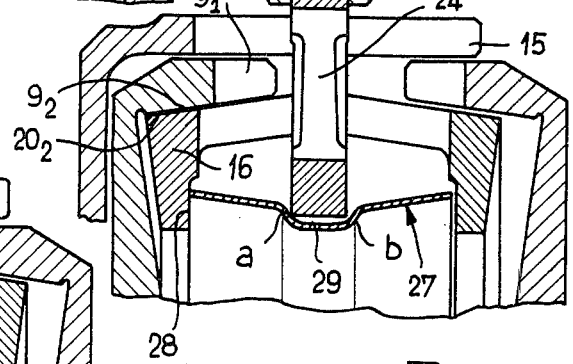

TRANSMISSION SYNCHRONIZER AND DOG-CLUTCH UNIT

The present invention relates to synchronizer and dog-clutch units for change-speed transmission mechanisms, notably for motor vehicles, of the type comprising a coupling bell rigid with a rotary shaft, a pair of female friction cones surrounded by said bell and provided with registering dog teeth, a pair of synchromesh rings provided with male cone surfaces adapted to co-act with said female friction cones respectively, said coupling bell having a peripheral set of axial teeth meshing with the radial spokes of a coupling ring, interlocking surfaces provided on said synchromesh rings and said coupling ring spokes respectively and adapted to co-operate as a consequence of the angular shifting of said synchromesh rings with respect to said coupling ring, said coupling ring reacting against a resilient member interposed between said coupling ring and said synchromesh rings.

To avoid any direct and continuous contact between the friction cones, the synchromesh rings are rigid with one another and an auxiliary thrust member co-operating with the side faces of said coupling ring and with the operative portions of the synchromesh rings is provided. These operative portions, whether in the form of camfaces, guiding surfaces or shoulders, require a preliminary machining of the synchromesh ring, thus preventing the use of raw synchromesh rings of which the dimensional characteristics are not to be checked accurately.

It is the essential object of the present invention to provide a form of embodiment utilizing a specific resilient member interposed between the synchromesh ring and the spokes of the coupling ring while permitting the use of raw synchromesh rings, without resorting to the aforementioned operative portions.

The invention is characterized essentially in that said resilient member is in the form of an expansible split sleeve fitted in pre-stressed condition in the central portion of the coupling ring, and that said sleeve has outflaring end portions each adjacent to the inner faces of the synchromesh rings, said synchromesh rings being in a manner known per se rigidly interconnected while the intermediate portion of said sleeve comprises a groove with inclined marginal portions coacting with said coupling ring, whereby when said coupling ring is in its neutral position said friction cones do not engage one another.

The more detailed description of the invention which is given hereunder will further illustrate that the inclined marginal portions of said groove and the outflared end portions of the expansible sleeve are useful not only for centering the synchromesh rings when these are disengaged from the friction cones but also for moving said synchromesh rings and keeping them in contact with the friction cones during the dog teeth engagement.

Other features and advantages of this invention will appear as the following description proceeds with reference to the attached drawing illustrating diagrammatically by way of example a typical form of embodiment thereof. In the drawing.

FIGS. 3 to 6 inclusive are fragmentary external views of the device, illustrating successive steps of its operation, and FIG. 7, 8 and 9 are fragmentary sectional views corresponding to the successive steps illustrated in FIGS. 3, 4 and 6, respectively, during the operation of the device.

Figure 1:
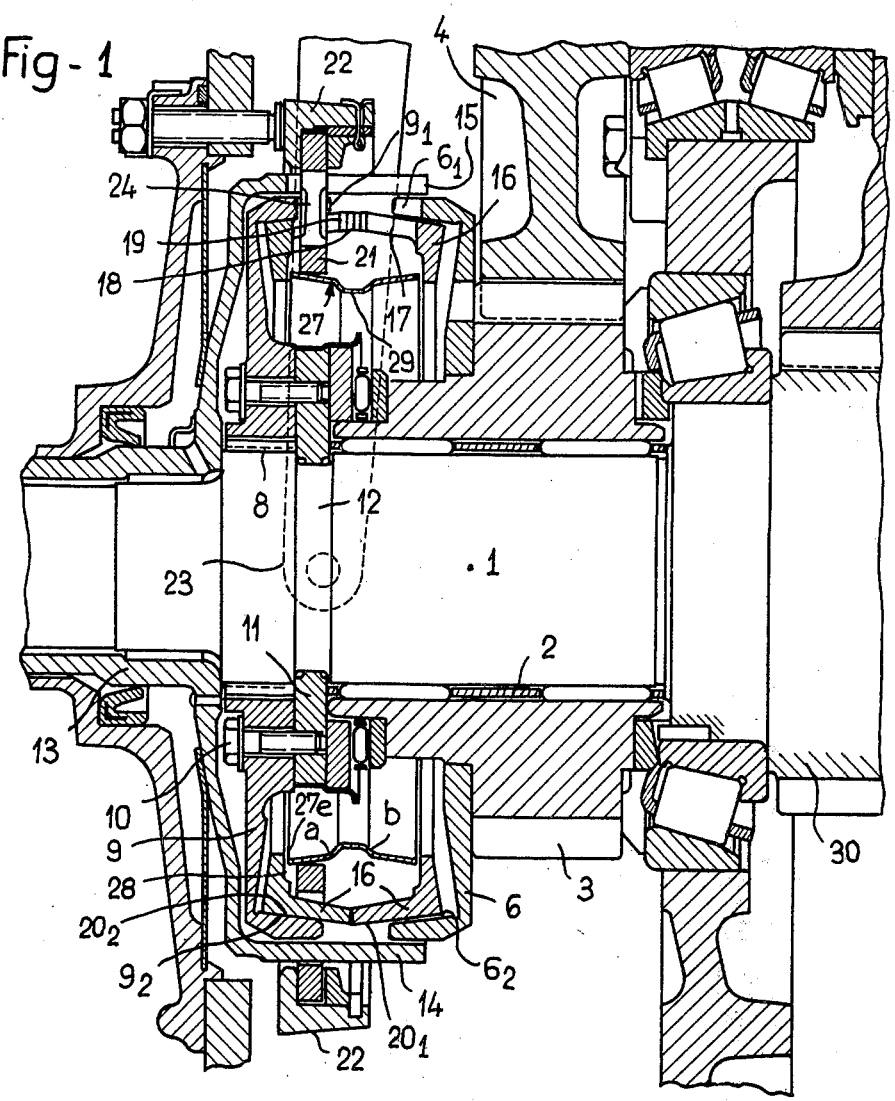
FIG. 1 is a longitudinal section illustrating the general arrangement of the synchromesh and dog clutch unit.

In the form of embodiment illustrated in FIG. 1, the reference numeral 1 designates the output shaft of a change-speed transmission or gearbox. This shaft 1 has a journal portion 2 supporting a free rotating gear or pinion 3 of a kinematic gear chain of which another gear 4 is in constant meshing engagement with gear 3.

This gear 3 is an integral part of a dog insert 6 provided with dog teeth $6_1$ and with a female friction cone $6_2$.

Shaft 1 comprises a splined portion 8 engaged by the correspondingly splined hub of a flange 9 provided with outer peripheral front dogs $9_1$ and also with a female friction cone $9_2$. This flange 9 is rigidly connected to shaft 1 by means of screws 10 engaging tapped holes formed in a two-section or split plate or annular member 11 fitted in a groove 12 of shaft 1.

A hollow shaft 13 concentric to shaft 1 carries a bell-shaped coupling member 14 formed with axial notches 15. Synchromesh rings 16 are rigidly assembled with each other to constitute a welded assembly comprising on the one hand peripheral apertures 17 formed with notches 18 having bevelled edges 19, and on the other hand male tapered surfaces $20_1$, $20_2$ adapted to engage the female friction cones $6_2$ or $9_2$ according to the axial direction in which a coupling ring 21 is actuated.

Figure 2:
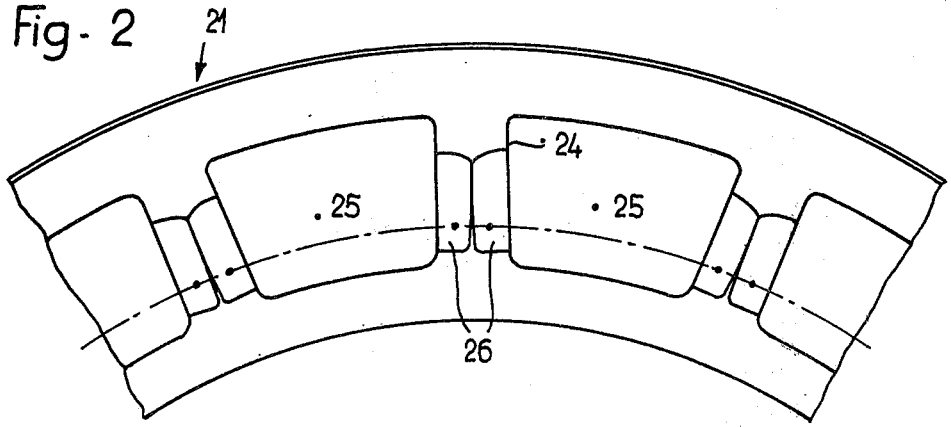
FIG. 2 is a fragmentary front view of the coupling ring.

Referring to FIGS. 1 and 2, it will be seen that this coupling ring 21 is mounted for loose rotation but locked for translation in relation to a ring 22 adapted to be actuated by a control or selector fork 23. The coupling ring 21 comprises radial spokes 24 disposed at spaced angular intervals which provide apertures 25 therebetween, whereby said spokes 24 are adapted, in the assembled condition of coupling ring 21, to engage the axial notches 15 of coupling bell 14 after engaging the apertures 17 formed in synchromesh rings 16, preliminary to the assembling and welding of these synchromesh rings.

These spokes 24 are formed with bevelled faces 26 adapted to co-operate with the bevelled edges 19 of notches 18 of synchromesh rings 16, as will be explained presently.

The device eventually comprises an axially split cylindrical expansion sleeve 27 fitted in a prestressed condition in the coupling ring 21.

The end edges 27e of sleeve 27 are outflared and adjacent to the inner control surfaces 28, respectively, of synchromesh rings 16, and the intermediate portion of sleeve 27 comprises a groove 29 having inclined marginal portions a, b engaging the edges of the inner bore of the annular central portion of coupling ring 21. Thus, it is clear that in the neutral position illustrated in FIG. 3 the synchromesh rings cannot engage with their male friction cones $20_1$, $20_2$ the female friction cones $6_2$ or $9_2$ (FIG. 7).

When this coupling ring 21 is moved to the left as seen in FIG. 1 the synchromesh unit is so arranged that it will firstly synchronize the gears and then interlock the hollow shaft 13 (which is also the input shaft of the gearbox or transmission mechanism) and the output shaft 1 carrying a gear or pinion 30.

When the coupling ring 21 is moved to the right as seen in FIG. 1, the synchromesh unit synchronizes the gears as in the preceding case and then interlocks the hollow input shaft 13 and the gear or pinion 3 mounted for loose rotation on output shaft 1.

The synchromesh device or unit thus constructed is used notably for doubling the number of transmission ratios of a gearbox or transmission.

Now the operation of the device according to this invention which is obtained when moving the coupling ring to the left will be described in detail, but it is obvious that the operation of the device would be similar if the coupling ring were moved to the right, as seen in the Figures.

When the spokes 24 of coupling ring 21 are engaged into the notches of dog teeth $9_1$ the synchromesh unit operates as follows:

Neutral (FIGS. 3 and 7):

As shown in FIG. 7 in neutral the tapered surface $20_2$ of synchromesh ring 16 does not contact the friction cone $9_2$ carried by flange 9. The hollow shaft 13 being the input shaft of the transmission mechanism will thus drive via the coupling bell 14 and spokes 24 of coupling ring 21 the synchromesh rings 16 at the same speed as said hollow shaft 13.

Pre-setting (FIGS. 4 and 8):

Considering FIGS. 4 and 8, it will be seen that in this pre-setting position the coupling ring 21 was moved slightly to the left in the direction of the arrow F. Starting from a position such as illustrated in FIG. 3, the left-hand central edge of coupling ring 21 will then exert a thrust against the edge or marginal portion a of groove 29, thus moving the sleeve 27 toward the control surface 28 of the corresponding synchromesh ring 16, whereby the latter will engage with its tapered surface $20_2$ the friction cone $9_2$ of flange 9. The difference between the rotational velocity of synchromesh ring 16 driven by the coupling bell 14 connected to shaft 13 and the rotational velocity of flange 9 connected to shaft 1, immediately as they engage each other, according to the direction $f$ of the relative rotation of coupling bell 14 and ring 21 in relation to shaft 1, produces an angular shift of synchromesh ring 16, such that the bevelled faces 26 of spokes 24 eventually abute the bevelled edges 19 of the relevant notches 18 of synchromesh ring 16.

As in any synchronizer with locking action the coupling ring 21 is thus initially locked during its movement toward the dog teeth $9_1$, until the respective velocities of synchromesh ring 16 and shaft 1 equal each other.

Synchronization:

This velocity equality is obtained through frictional relative engagement between the tapered surfaces $9_2$ and $20_2$. The taper angle of bevelled surfaces 26 of spokes 24 and the corresponding inclination of the bevelled edges 19 of notches 18 are such that the friction torque due to the mutual engagement of tapered surfaces $9_2$ and $20_2$ is attended by an axial locking action counteracting the effort for moving the coupling member 21 in the desired direction. The movement of ring 21 toward the dog teeth $9_1$ is thus momentarily prevented by a force, and this force disappears when the velocities of friction surfaces $9_2$ and $20_2$ become equal.

Dog-clutch engagement:

As illustrated in FIGS. 5, 6 and 9, the synchronization is obtained when the friction torque and the axial locking action are eliminated, the synchronizer being released in a manner known per se by shifting the synchromesh ring 16 angularly in relation to the spokes 24 of ring 21, in the direction of the arrow $f$. Then, the coupling ring 21 can continue its movement in the axial direction of the arrow F while compressing the outflared portion 27e of sleeve 27 and thus engaging the spokes 24 between the teeth of dog member $9_1$ formed with bevelled faces 31 (FIGS. 5 and 6) for facilitating this engagement. It will then be noted that during the dog engaging operation the outflared end 27e of sleeve 27 tends to keep the synchromesh ring 16 in contact with the friction cone $9_2$. In fact, it is clear that the slope of the outflared portion of sleeve 27 causes a residual keeping friction force $r_0$ to develop, this force constituting the axial component of the resilient deformation force R to which the centrifugal force applied notably to the outflared portion of the sleeve in the dog engagement position is also added. This residual keeping friction force $r_0$ will thus prevent the receding of the complete set of synchromesh rings and any frictional contact between the friction surfaces such as $20_1$ and $6_2$ opposite the friction surfaces in mutual contact.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. A synchronizing and dog-clutch device for change-speed mechanism, which comprises a coupling bell rigid with a rotary shaft, a pair of female friction cones surrounded by said bell and provided with registering sets of dog teeth, a pair of synchromesh rings provided with male tapered surfaces adapted to co-act with said female friction cones, respectively, said coupling bell comprising peripheral axial teeth in meshing engagement with the radial spokes of a coupling ring, interlocking surfaces formed on said synchromesh rings and said coupling ring spokes, respectively, and adapted to co-act with each other by angularly shifting said synchromesh rings in relation to said coupling ring, said coupling ring reacting against a resilient member interposed between said coupling ring and said synchromesh rings, said resilient member consisting of a split expansible cylindrical sleeve mounted in a pre-stressed condition in the central portion of said coupling ring while said sleeve has outflaring ends adjacent each inner surface, respectively, or said synchromesh rings, said synchromesh rings being rigidly assembled with each other, the intermediate portion of said sleeve comprising a groove having inclined marginal portions adapted to co-operate with said coupling ring, whereby in the neutral position of said coupling ring said female friction cones are disengaged from said male tapered surfaces.

2. A synchronizing and dog-clutch device as set forth in claim 1, wherein the central portion of said coupling ring is a circular annulus interconnecting the spokes and formed with edges adapted to co-act with the aforesaid inclined marginal portions of said groove of said expansible sleeve.

* * * * *